(12) United States Patent
Nguyen

(10) Patent No.: US 7,419,167 B1
(45) Date of Patent: Sep. 2, 2008

(54) SLED DEVICE

(76) Inventor: Thien V. Nguyen, 20 Brooktree Cir., Lindenhurst, NY (US) 11757

( * ) Notice: Subject to any disclaimer, the term of this patent is extended or adjusted under 35 U.S.C. 154(b) by 0 days.

(21) Appl. No.: 11/844,077

(22) Filed: Aug. 23, 2007

(51) Int. Cl.
B62B 13/18 (2006.01)
(52) U.S. Cl. .............................. 280/9; 280/10; 280/86.5; 280/638; 280/8; 280/7.12; 280/43.22; 280/43.24; 280/24; 280/43.14
(58) Field of Classification Search ............. 280/9, 280/10, 86.5, 638, 8, 7.12, 43.22, 43.24, 280/24, 43.14
See application file for complete search history.

(56) References Cited

U.S. PATENT DOCUMENTS

| 2,783,055 | A | * | 2/1957 | Michaud | .................. 280/43.14 |
| 3,730,542 | A | | 5/1973 | Chadwick | |
| 3,822,069 | A | | 7/1974 | Hoff | |
| 4,159,119 | A | | 6/1979 | Smith | |
| 4,291,891 | A | * | 9/1981 | Blanchette | ....................... 280/9 |
| 4,437,957 | A | | 3/1984 | Freeman | |
| D302,958 | S | | 8/1989 | Shippee et al. | |
| 5,413,361 | A | | 5/1995 | Mosher | |
| 6,042,122 | A | * | 3/2000 | Mohr | ............................ 280/9 |

* cited by examiner

Primary Examiner—Christopher Ellis
Assistant Examiner—Cynthia F Collado

(57) ABSTRACT

A sled device for permitting transportation of a person and cargo over a variety of surfaces includes a sled including a bottom wall and a perimeter wall that extends upwardly from the bottom wall to define a receiving space of the sled to receive the person and cargo. The bottom wall is slidable along a soft support surface. A front wheel assembly is rotatably coupled to the sled and is rotatable between a deployed position and a stowed position. The front wheel assembly engages and rolls along a hard support surface when the front wheel assembly is in the deployed position. A plurality of rear wheel assemblies is pivotally coupled to the sled and each is pivotable between a lowered position and a raised position. The rear wheel assemblies engage and roll along the hard support surface when the rear wheel assemblies are in the lowered position.

13 Claims, 5 Drawing Sheets

SLED DEVICE

BACKGROUND OF THE INVENTION

1. Field of the Invention

The present invention relates to convertible sleds and more particularly pertains to a new convertible sled for permitting transportation of a person and cargo over a variety of surfaces.

2. Description of the Prior Art

The use of convertible sleds is known in the prior art. While these devices fulfill their respective, particular objectives and requirements, the need remains for a device that has certain improved features that allow the device to be transported over water and land. Additionally, the device should have wheel assemblies that are stowed away from a bottom wall of the device to inhibit damage to the wheel assemblies when the device is transported across soft support surfaces.

SUMMARY OF THE INVENTION

The present invention meets the needs presented above by generally comprising a sled including a bottom wall and a perimeter wall that extends upwardly from the bottom wall to define a receiving space of the sled. The receiving space receives a person and cargo. The bottom wall is slidable along a soft support surface to facilitate transportation of the person and the cargo. A front wheel assembly is rotatably coupled to the sled. The front wheel assembly is rotated between a deployed position and a stowed position. The front wheel assembly engages and rolls along a hard support surface to facilitate transport of the sled over the hard support surface when the front wheel assembly is in the deployed position. A plurality of rear wheel assemblies is pivotally coupled to the sled. Each of the rear wheel assemblies is pivoted between a lowered position and a raised position. The rear wheel assemblies engage and roll along the hard support surface when the rear wheel assemblies are in the lowered position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
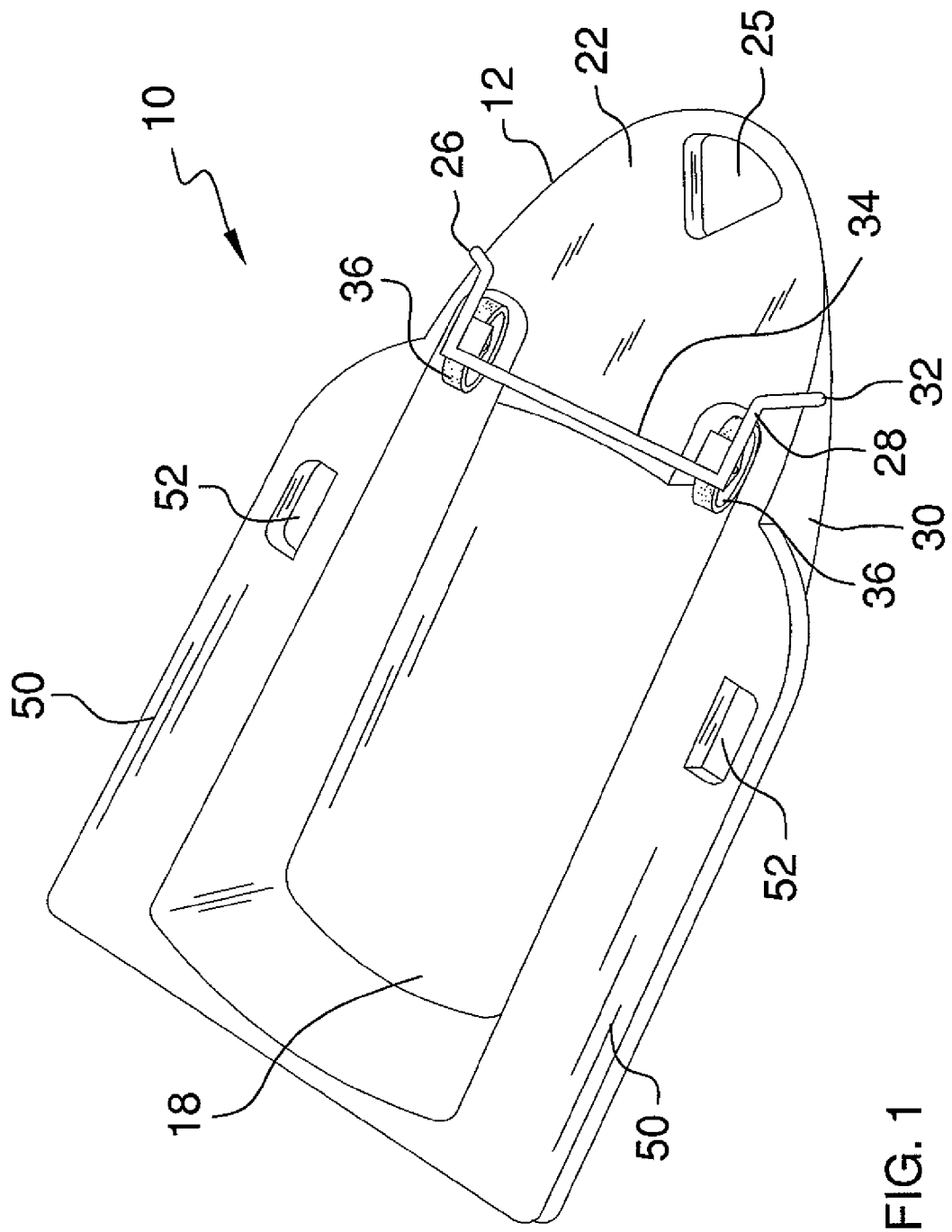
FIG. 1 is a perspective view of a sled device according to the present invention.
Figure 2:
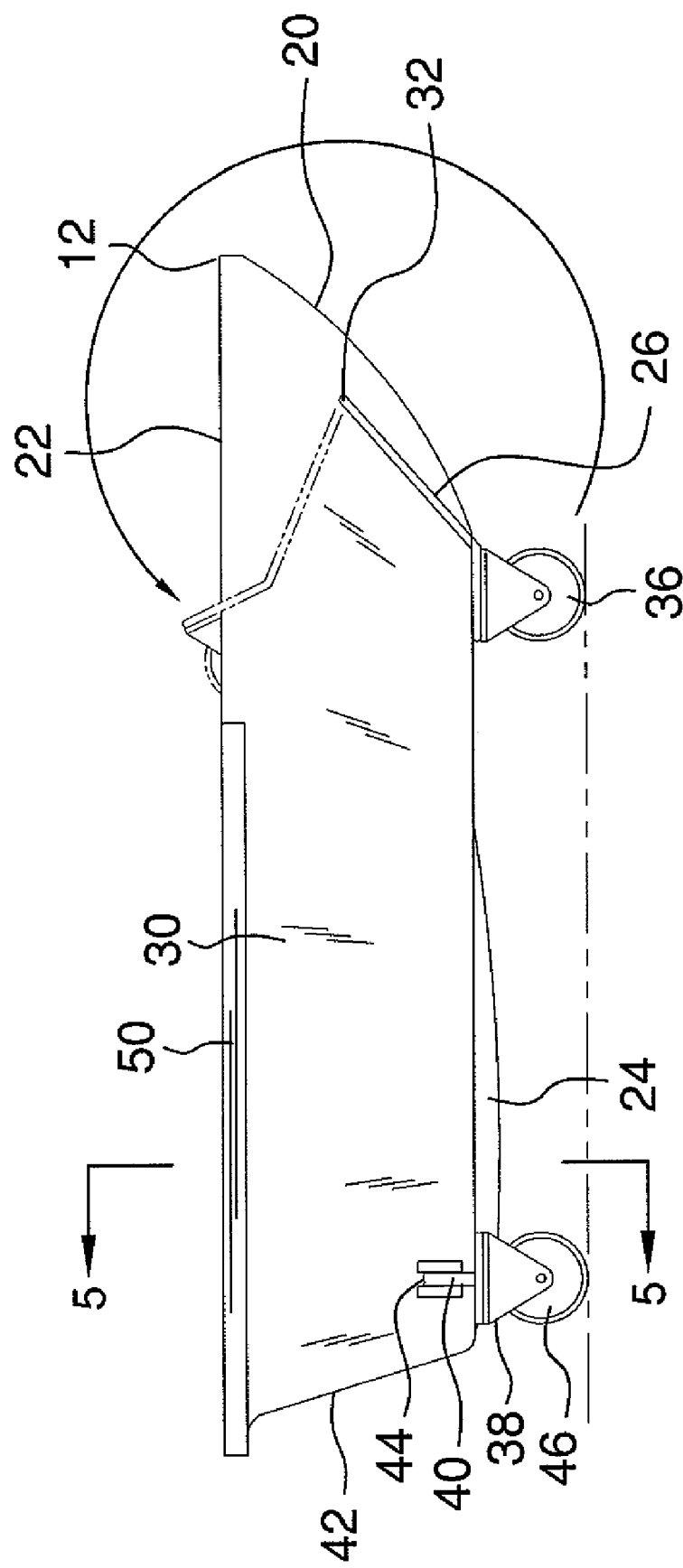
FIG. 2 is a side view of the present invention.
Figure 3:
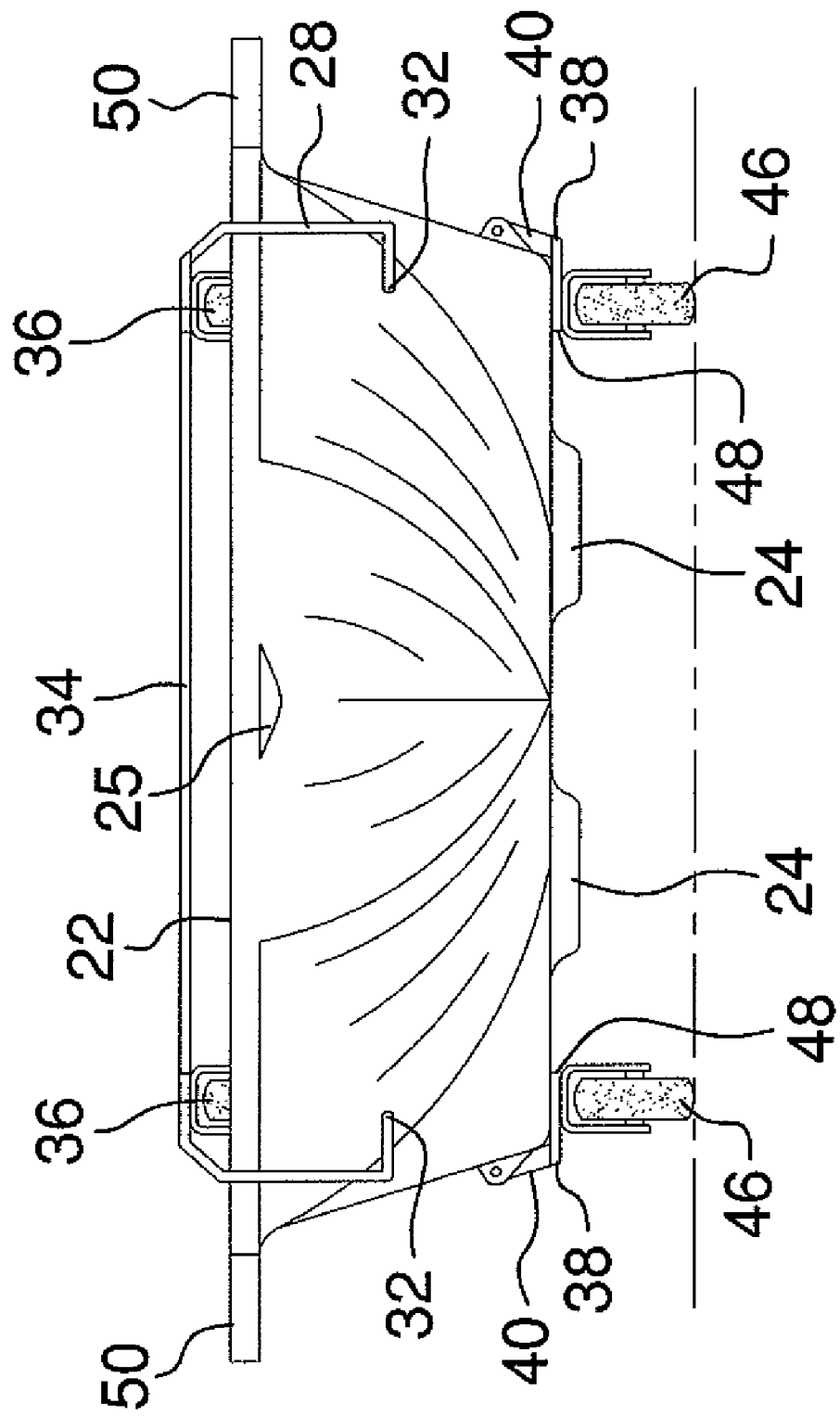
FIG. 3 is a front view of the present invention with the front wheel assembly in the stowed position.
Figure 4:
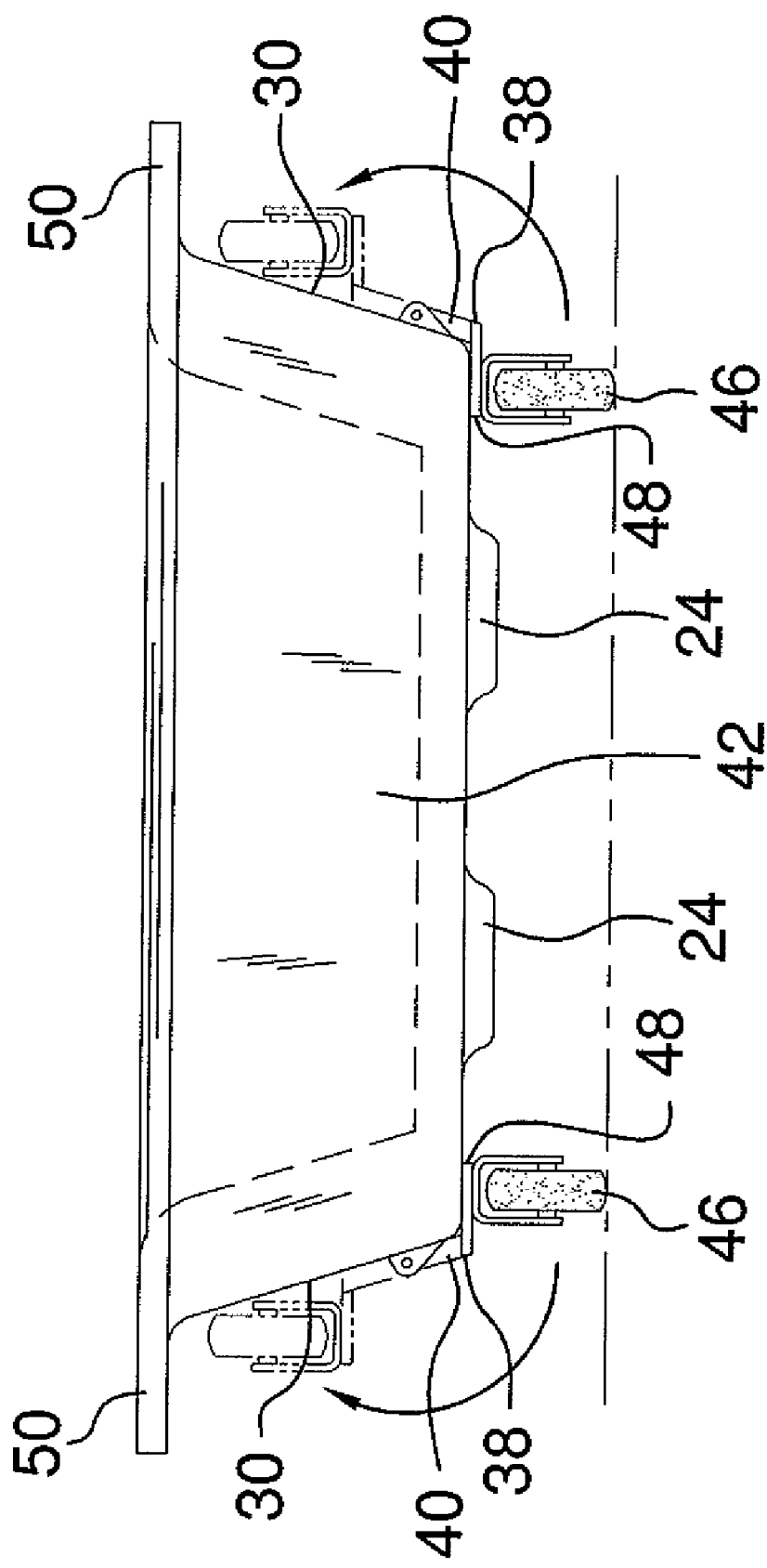
FIG. 4 is a rear view of the present invention.
Figure 5:
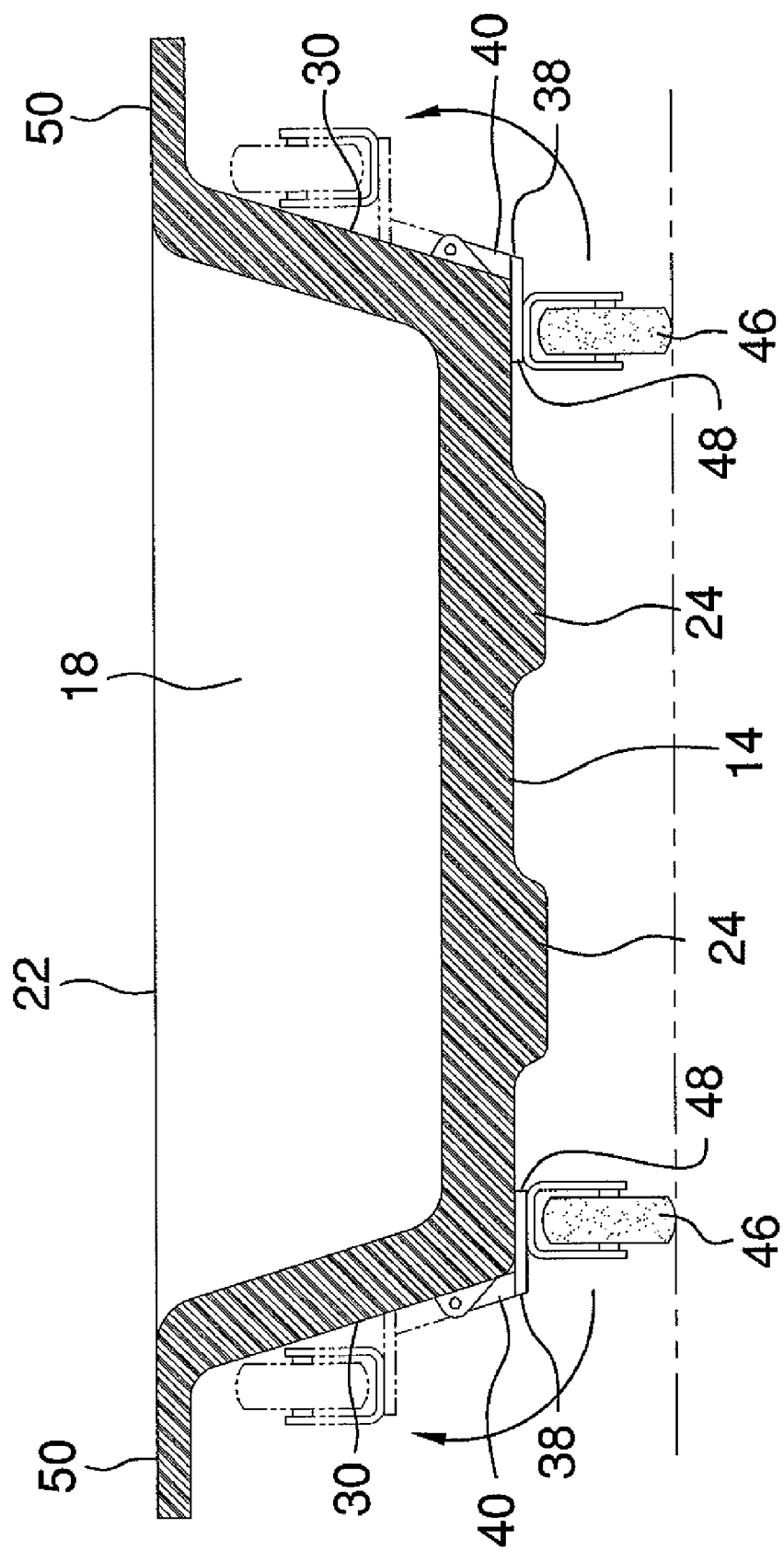
FIG. 5 is a cross-sectional view of the present invention taken along line 5-5 of FIG. 2.

With reference now to the drawings, and in particular to FIGS. 1 through 5 thereof, a new convertible sled embodying the principles and concepts of the present invention and generally designated by the reference numeral 10 will be described.

As best illustrated in FIGS. 1 through 5, the sled device 10 generally comprises a sled 12 including a bottom wall 14 and a perimeter wall 16 that extends upwardly from the bottom wall 14 to define a receiving space 18 of the sled 12. The receiving space 18 receives a person and cargo. The bottom wall 14 is slidable along a soft support surface, such as sand or water, to facilitate transportation of the person and the cargo. A front face 20 of the sled 12 arcuately extends backwardly from a top face 22 of the sled 12 to the bottom wall 14 to force the bottom wall 14 to rise over variations in the soft support surface. The sled 12 includes a plurality of ridges 24 that extend downwardly from the bottom wall 14 and extend along portion of a length of the sled 12. The ridges 24 extend into the soft support surface to inhibit lateral movement of the sled 12. The sled 12 has a towing aperture 25 extending through the perimeter wall 16 to permit the perimeter wall 16 to be grasped to facilitate towing of the sled 12. The sled 12 has a length of approximately 3 feet and a width of approximately 2 feet.

A front wheel assembly 26 is rotatably coupled to the sled 12. The front wheel assembly 26 is rotated between a deployed position and a stowed position. The front wheel assembly 26 engages and rolls along a hard support surface to facilitate transport of the sled 12 over the hard support surface when the front wheel assembly 26 is in the deployed position. The front wheel assembly 26 includes a support bar 28 rotatably coupled to the sled 12 and positioned adjacent the front face 20 of the sled 12. The support bar 28 is approximately U-shaped. Each of a pair of side faces 30 of the sled 12 has on a pair of opposing ends 32 of the support bar 28 rotatably coupled thereto. A medial section 34 of the support bar 28 is positioned under the bottom wall 14 of the sled 12 when the front wheel assembly 26 is in the deployed positioned. The medial section 34 of the support bar 28 is positioned above the top face 22 of the sled 12 when the front wheel assembly 26 is in the stowed position.

The front wheel assembly 26 also includes a pair of front wheels 36 coupled to the support bar 28. Each of the front wheels 36 is coupled to the medial portion of the support bar 28. The front wheels 36 extend between the support bar 28 and the hard support surface to permit the front wheels 36 to roll along the hard support surface when the front wheel assembly 26 is in the deployed position. The front wheels 36 extend into the receiving space 18 of the sled 12 when the front wheel assembly 26 is in the stowed position.

A plurality of rear wheel assemblies 38 is pivotally coupled to the sled 12. Each of the rear wheel assemblies 38 is pivoted between a lowered position and a raised position. The rear wheel assemblies 38 engage and roll along the hard support surface when the rear wheel assemblies 38 are in the lowered position. Each of the rear wheel assemblies 38 includes a bracket arm 40 pivotally coupled to the sled 12 and positioned adjacent a rear face 42 of the sled 12. A secured end 44 of the bracket arm 40 is pivotally coupled to one of the side faces 30 of the sled 12. The bracket arm 40 is approximately L-shaped.

Each of the rear wheel assemblies 38 also includes a rear wheel 46 coupled to the bracket and positioned adjacent a free end 48 of the bracket arm 40 positioned distal to the secured end 44. The rear wheel 46 is positioned under the bottom wall 14 of the sled 12 to roll along the hard support surface when the associated one of the rear wheel assemblies 38 is in the lowered position. The rear wheel 46 is positioned adjacent to and outwardly extends from an associated one of the side faces 30 when the associated one of the rear wheel assemblies 38 is in the raised position.

Each of the side faces 30 of the sled 12 has one of a pair of extension plates 50 coupled thereto. Each of the extension plates 50 is positioned adjacent the top face 22 of the sled 12. Each of the extension plates 50 has a hand aperture 52 extending therethrough to permit a hand to be extended through the hand aperture 52 to grip a portion of the associated one of the extension plates 50 by the person in the sled 12.

In use, the sled 12 is placed on the soft support surface with the front wheel assembly 26 in the stowed positioned and the rear wheel assemblies 38 in the raised position. The bottom wall 14 of the sled 12 slides on the soft support surface to the desired location as the sled 12 is being pulled. To access area with hard support surfaces the front wheel assembly 26 is rotated to the deployed position and the rear wheel assemblies 38 are pivoted to the lowered position. The front wheels 36 and the rear wheels 46 are then rolled along the hard support surface to transport the sled 12 to the desired location.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A sled device for transporting a person and cargo over a variety of surfaces, said device comprising:
    a sled including a bottom wall and a perimeter wall extending upwardly from said bottom wall to define a receiving space of said sled, said receiving space receiving the person and cargo, said bottom wall being slidable along a soft support surface to facilitate transportation of the person and the cargo;
    a front wheel assembly being rotatably coupled to said sled, said front wheel assembly being rotated between a deployed position and a stowed position, said front wheel assembly engaging and rolling along a hard support surface to facilitate transport of said sled over the hard support surface when said front wheel assembly is in said deployed position; and
    a plurality of rear wheel assemblies being pivotally coupled to said sled, each of said rear wheel assemblies being pivoted between a lowered position and a raised position, said rear wheel assemblies engaging and rolling along the hard support surface when said rear wheel assemblies are in the lowered position, a medial section of a support bar is positioned under said bottom wall of said sled when said front wheel assembly is in the deployed positioned, said medial section of said support bar being positioned above said top face of said sled when said front wheel assembly is in the stowed position, each of said front wheels being coupled to said medial portion of said support bar.

2. The device according to claim 1, wherein a front face of said sled arcuately extends backwardly from a top face of said sled to said bottom wall to force said bottom wall to rise over variations in the soft support surface.

3. The device according to claim 1, wherein said sled includes a plurality of ridges extending downwardly from said bottom wall and extending along portion of a length of said sled, said ridges extending into the soft support surface to inhibit lateral movement of said sled.

4. The device according to claim 1, wherein said sled has a towing aperture extending through said perimeter wall to permit the perimeter wall to be grasped to facilitate towing of said sled.

5. The device according to claim 1, wherein said front wheel assembly includes a support bar being rotatably coupled to said sled and positioned adjacent a front face of said sled, said support bar being approximately U-shaped, each of a pair of side faces of said sled having one a pair of opposing ends of said support bar being rotatably coupled thereto.

6. The device according to claim 5, wherein said front wheel assembly includes a pair of front wheels being coupled to said support bar said front wheels extending between said support bar and the hard support surface to permit said front wheels to roll along the hard support surface when said front wheel assembly is in the deployed position, said front wheels extending into said receiving space of said sled when said front wheel assembly is in the stowed position.

7. The device according to claim 1, wherein each of said rear wheel assemblies includes a bracket arm being pivotally coupled to said sled and positioned adjacent a rear face of said sled, a secured end of said bracket arm being pivotally coupled to one of a pair of side faces of said sled.

8. The device according to claim 7, wherein said bracket arm being approximately L-shaped.

9. The device according to claim 7, wherein each of said rear wheel assemblies includes a rear wheel being coupled to said bracket, said rear wheel being positioned under said bottom wall of said sled to roll along the hard support surface when the associated one of said rear wheel assemblies is in the lowered position, said rear wheel being positioned adjacent to and outwardly extending from an associated one of said side faces when the associated one of said rear wheel assemblies is in the raised position.

10. The device according to claim 9, wherein said rear wheel is positioned adjacent a free end of said bracket arm positioned distal to said secured end.

11. The device according to claim 1, further comprising a pair of extension plates, each of a pair of side faces of said sled having one of said extension plates being coupled thereto, each of said extension plates being positioned adjacent a top face of said sled.

12. The device according to claim 11, wherein each of said extension plates has a hand aperture extending therethrough to permit a hand to be extended through said hand aperture to grip a portion of the associated one of said extension plates by the person in said sled.

13. A sled device for transporting a person and cargo over a variety of surfaces, said device comprising:
    a sled including a bottom wall and a perimeter wall extending upwardly from said bottom wall to define a receiving space of said sled, said receiving space receiving the person and cargo, said bottom wall being slidable along a soft support surface to facilitate transportation of the person and the cargo, a front face of said sled arcuately extending backwardly from a top face of said sled to said bottom wall to force said bottom wall to rise over variations in the soft support surface, said sled including a plurality of ridges extending downwardly from said bottom wall and extending along portion of a length of said sled, said ridges extending into the soft support surface to inhibit lateral movement of said sled, said sled having a towing aperture extending through said perimeter wall to permit the perimeter wall to be grasped to facilitate towing of said sled;

a front wheel assembly being rotatably coupled to said sled, said front wheel assembly being rotated between a deployed position and a stowed position, said front wheel assembly engaging and rolling along a hard support surface to facilitate transport of said sled over the hard support surface when said front wheel assembly is in said deployed position, said front wheel assembly including;

a support bar being rotatably coupled to said sled and positioned adjacent said front face of said sled, said support bar being approximately U-shaped, each of a pair of side faces of said sled having one a pair of opposing ends of said support bar being rotatably coupled thereto, a medial section of said support bar being positioned under said bottom wall of said sled when said front wheel assembly is in the deployed positioned, said medial section of said support bar being positioned above said top face of said sled when said front wheel assembly is in the stowed position;

a pair of front wheels being coupled to said support bar, each of said front wheels being coupled to said medial portion of said support bar, said front wheels extending between said support bar and the hard support surface to permit said front wheels to roll along the hard support surface when said front wheel assembly is in the deployed position, said front wheels extending into said receiving space of said sled when said front wheel assembly is in the stowed position;

a plurality of rear wheel assemblies being pivotally coupled to said sled, each of said rear wheel assemblies being pivoted between a lowered position and a raised position, said rear wheel assemblies engaging and rolling along the hard support surface when said rear wheel assemblies are in the lowered position, each of said rear wheel assemblies comprising;

a bracket arm being pivotally coupled to said sled and positioned adjacent a rear face of said sled, a secured end of said bracket arm being pivotally coupled to one of said side faces of said sled, said bracket arm being approximately L-shaped;

a rear wheel being coupled to said bracket and positioned adjacent a free end of said bracket arm positioned distal to said secured end, said rear wheel being positioned under said bottom wall of said sled to roll along the hard support surface when the associated one of said rear wheel assemblies is in the lowered position, said rear wheel being positioned adjacent to and outwardly extending from an associated one of said side faces when the associated one of said rear wheel assemblies is in the raised position; and a pair of extension plates, each of said side faces of said sled having one of said extension plates being coupled thereto, each of said extension plates being positioned adjacent said top face of said sled, each of said extension plates having a hand aperture extending therethrough to permit a hand to be extended through said hand aperture to grip a portion of the associated one of said extension plates by the person in said sled.

\* \* \* \* \*